United States Patent
Szymczak et al.

(10) Patent No.: US 8,311,713 B2
(45) Date of Patent: Nov. 13, 2012

(54) MULTI RATIO TRANSMISSION

(75) Inventors: Dominique Szymczak, Beauvais (FR); Malcolm Shute, St Germain la Porterie (FR)

(73) Assignee: AGCO SA, Beauvais (FR)

( * ) Notice: Subject to any disclaimer, the term of this patent is extended or adjusted under 35 U.S.C. 154(b) by 954 days.

(21) Appl. No.: 12/261,298

(22) Filed: Oct. 30, 2008

(65) Prior Publication Data

US 2009/0062996 A1 Mar. 5, 2009

Related U.S. Application Data

(63) Continuation of application No. 11/275,680, filed on Jan. 24, 2006, now abandoned.

(30) Foreign Application Priority Data

Feb. 11, 2005 (GB) .................................. 0502867.5

(51) Int. Cl.
B60K 6/54 (2007.10)
(52) U.S. Cl. .......................................... 701/57; 60/431
(58) Field of Classification Search .................... 701/57; 74/473.1–473.3, 473.18, 473.21; 180/323, 180/333, 336; 172/2, 3; 56/10.8; 477/107; 60/431, 433, 450, 452, 487, 490
See application file for complete search history.

(56) References Cited

U.S. PATENT DOCUMENTS

| | | | |
|---|---|---|---|
| 5,067,362 A | 11/1991 | Holdenried | |
| 5,127,288 A | 7/1992 | Hojo et al. | |
| 5,261,495 A | 11/1993 | Szymczak | |
| 5,315,897 A | 5/1994 | Abe et al. | |
| 6,151,543 A | 11/2000 | McKee et al. | |
| 6,553,302 B2 * | 4/2003 | Goodnight et al. | 701/54 |
| 6,615,569 B1 | 9/2003 | Carlz | |
| 6,761,658 B1 * | 7/2004 | Stettler, Jr. | 475/73 |
| 7,086,227 B2 * | 8/2006 | Yano et al. | 60/433 |
| 2002/0010534 A1 | 1/2002 | Goodnight et al. | |
| 2005/0027421 A1 | 2/2005 | Humpal et al. | |

FOREIGN PATENT DOCUMENTS

| | | |
|---|---|---|
| EP | 0547598 | 6/1993 |
| EP | 0644360 | 3/1995 |

OTHER PUBLICATIONS

European Search Report for European Application No. 06001673 dated May 3, 2006.

* cited by examiner

*Primary Examiner* — Dalena Tran

(57) ABSTRACT

A multi-ratio tractor transmission system including a series arrangement of a speed changing gearbox and a range changing gearbox. The system is selectively operable in a field working automatic mode and a road working automatic mode, wherein the transmission can only operate automatically within its speed change gearbox when the system is operating in the field working automatic mode.

14 Claims, 2 Drawing Sheets

MULTI RATIO TRANSMISSION

CROSS REFERENCE TO RELATED APPLICATION

This application is a continuation of application Ser. No. 11/275,680, filed 24 Jan. 2006, which application claims priority under 35 USC § 119 to United Kingdom Patent Application Number 0502867.5 filed on 11 Feb. 2005, both of which are herein incorporated by reference in their entirety as if fully set forth below.

BACKGROUND OF THE INVENTION

Field of the Invention

This invention relates to multi-ratio tractor transmissions which have an automated mode of operation.

BRIEF SUMMARY OF THE INVENTION

According to the present invention there is provided multi-ratio tractor transmission system comprising a series arrangement of a speed changing gearbox and a range changing gearbox, the system being selectively operable in a field working automatic mode and a road working automatic mode, wherein the transmission can only operate automatically within its speed change gearbox when the system is operating in the field working automatic mode.

The speed changing box may be a multi-ratio epicyclic unit and the range change box may be a synchromesh unit. With such series arrangements it is desirable to provide some so-called "speed matching" capability when the overall control of the active transmission ratio ensures that when a range change is made the ratio selected in the speed changing box is also adjusted to ensure that the ratio provided by the overall transmission is the next overall available ratio in the transmission.

The transmission system may be operable in a speed-matching mode wherein the ratio of the speed changing gearbox is automatically selected so as to deliver the next overall available ratio in the transmission in response to the operator changing the ratio of the range changing gearbox. Therefore, when a range change occurs, the overall control of the transmission adjusts the ratio of the speed changing box to ensure that the ratio provided by the overall transmission is the next overall available ratio in the transmission. When in these "speed matching" zones the ratio changes must be commanded by the operator.

In a preferred embodiment, the engine speed at which the transmission changes up in ratio when operating automatically can being selectable by the operator. The engine speed at which the transmission changes up in ratio may be selectable within a pre-defined range. Typically this change-up speed may be variable between say 1600 rpm and 2200 rpm.

The speed at which the transmission changes down when in the automatic mode may conveniently be linked to the selected change-up speed. For example, the change down may be arranged to be initiated when the engine speed has fallen to 20% below the selected change-up speed.

BRIEF DESCRIPTION OF THE DRAWINGS

One embodiment of the present invention will now be described, by way of example only, with reference to the accompanying drawings in which.

DETAILED DESCRIPTION OF PREFERRED EMBODIMENTS

Figure 1:
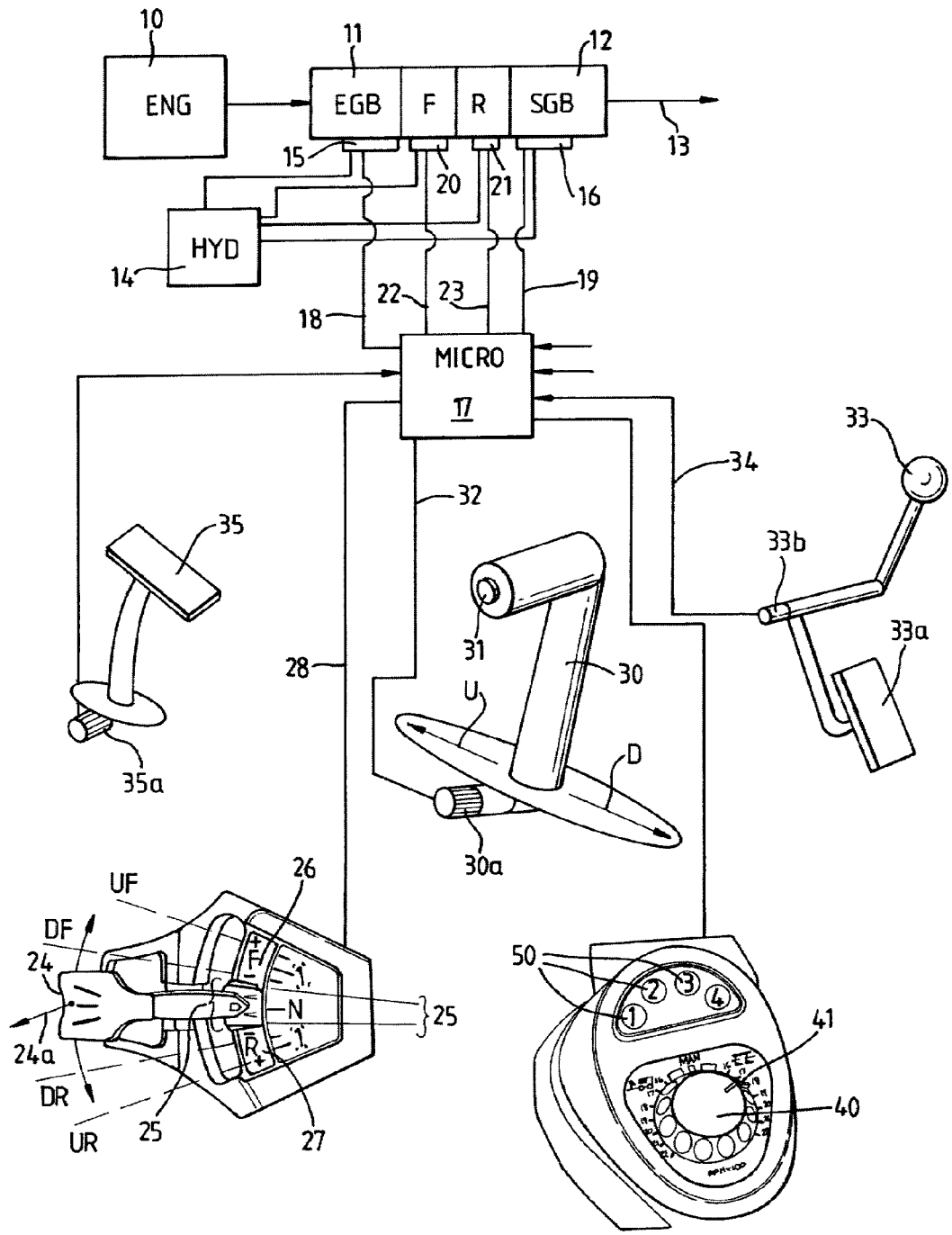
FIG. 1 show diagrammatically the controls for a multi-ratio tractor transmission in accordance with the present invention.

Referring to FIG. 1 this show in diagrammatic form the controls of a multi-ratio tractor transmission in which an engine 10 drives a multi-ratio epicyclic gearbox 11 in series with forward and reverse clutches F and R and a multi-ratio synchromesh gearbox 12 whose output 13 drives the wheels of the tractor via suitable differentials and final drive gears etc which are not shown.

Typically the epicyclical gearbox 11 will provide six ratios and the synchromesh gearbox 12 will provide four range ratios. These ratios are changed hydraulically by pressurised fluid provided from a hydraulic source 14 which includes a hydraulic pump etc. The ratio changes are controlled by solenoid operated hydraulic control valves 15 associated with epicyclic gearbox 10 and similar valves 16 associated with synchromesh box 12. These valves are in turn operated by electrical signals from a microprocessor control unit 17 via lines 18 and 19 respectively.

The forward and reverse clutches F and R are also hydraulically operated with pressure from source 14 and are controlled by solenoid operated valves 20 and 21 respectively via lines 22 and 23.

Microprocessor control unit 17 receives inputs from the following driver operated controls and from other sensors on the tractor.

A so-called shuttle lever 24, designed to be operated by the driver's left hand, controls both the direction of motion of the tractor (i.e. forward or reverse) and also the operative ratio in the selected direction. A sensor (not shown) which indicates the position of lever 24 is connected to microprocessor control unit 17 via line 28. Lever 24 has a central neutral zone 25 (shown in FIG. 1), a forward zone of operation 26 and a reverse zone of operation 27. When in the forward zone of operation 26 the associated transmission can be changed up a ratio in the forward direction each time the lever 24 is moved in the UF direction and down a ration each time the lever 24 is moved in the DF direction. Similarly when in the reverse zone of operation the associated transmission can be changed up a ratio in the reverse direction each time the lever 24 is moved in the UR direction and down a ratio each time the lever 24 is moved in the DR direction. These movements of lever 24 trigger all the necessary operations of the ratio changing valves 15 and 16 and the clutch valves 20 and 21 to make the requested ratio changes The lever 24 also disengages the operative forward or reverse clutch (F, R) if the lever is pulled up towards the operator, as indicated by arrow 24a.

The transmission is also controllable by a control lever 30 which when moved in the upward direction U and held displaced in this direction causes the transmission to progressively shift up through the six ratios provided by epicyclical gearbox 11 and, if a range change is required in synchromesh gearbox 12, the drive can be disconnected by pressing button 31 on the end of lever 30 to disengage either the forward or reverse drive clutch F or R depending on which clutch is currently operative. Thus, with the lever 30 displaced in the upward direction U each pressing of button 31 causes the transmission to shift up a range in the gearbox 12. The transmission can be caused to shift quickly up through the ratios provided by box 11 by quickly pulsing the lever 30 in direction U, each pulsing movement of lever 30 producing a change up in ratio. Similarly, movement of lever 30 in the down change direction D results in progressive changes down in ratio with the same facility to quickly change down one ratio at a time by pulsing the lever 30 in the D direction. Also each pressing of the button 31 with the lever displaced in the downward direction D causes the transmission to shift down a range in gearbox 12. Lever 30 is provided with a position sensor 30a which is connected to control unit 17 via line 32.

A hand throttle lever 33 is also provided which sets the engine speed and which is mechanically linked with a throttle pedal 33a which has a sensor 33b which is connected to control unit 17 via line 34. A clutch pedal 35 is also provide which when pressed disconnects the operative forward or reverse clutch F or R to disconnect drive through the transmission. This pedal, which also has a sensor 35a connected with the control unit 17, is used primarily when starting the vehicle and as an emergency method of disconnecting drive.

Figure 2:
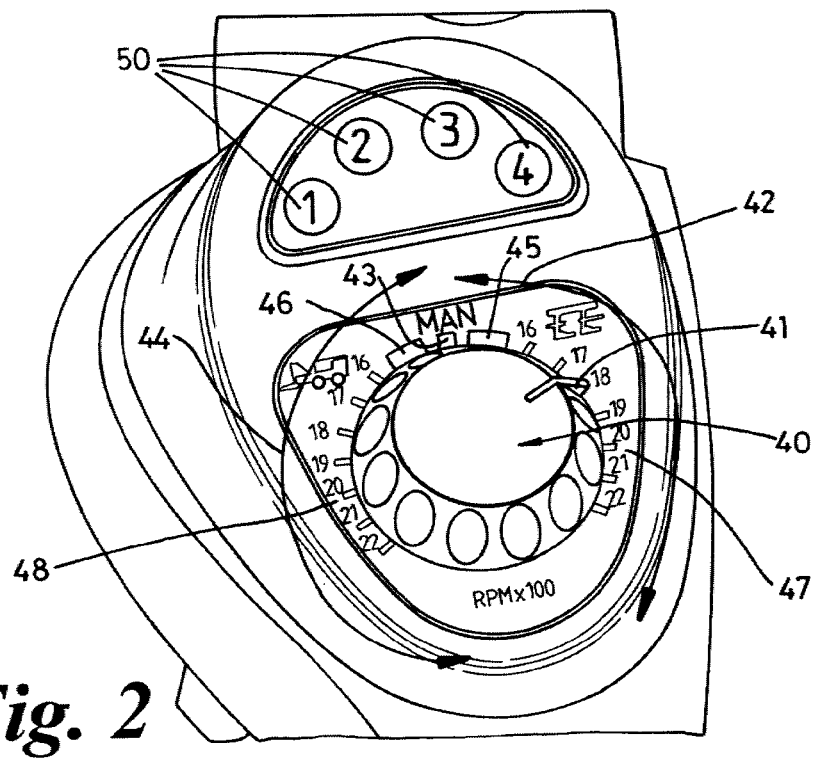
FIG. 2 shows a perspective view of a controller for the multi-ratio tractor transmission of the present invention.
Figure 3:
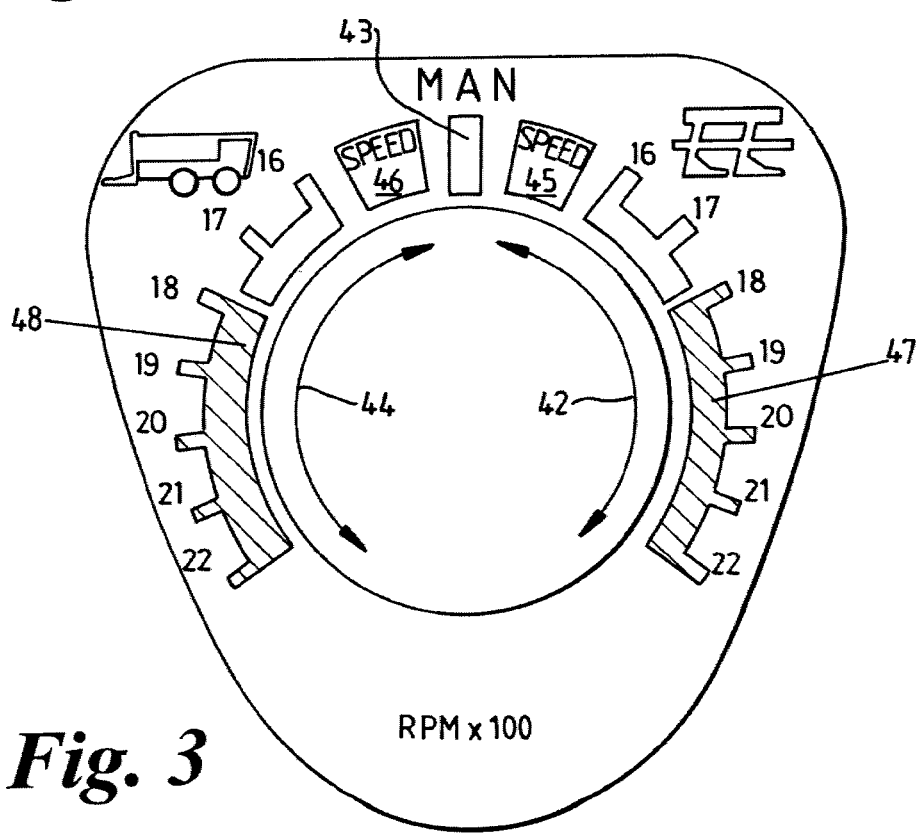
FIG. 3 shows the layout of the control zones of the controller of FIG. 2 more clearly.

A further transmission controller is provided in the form of a dial 40 (see FIGS. 2 and 3) which has a datum indicator 41 which is rotatable in two selection zones, a field working zone 42 entered by clockwise rotation from a central position 43 and a road working zone 44 entered by anti-clockwise rotation from central position 43.

When in the dial is set in the central position 43 the transmission operates in a manual selection mode in which there is no matching of the speed when a range changes occur. Thus, for example, if the transmission is in the sixth speed of the epicyclic box 11, and the range is changed (by operating button 31) from range 1 to range 2, the transmission will change to operating in the sixth ratio of box 11 and range 2 which is not the next higher transmission ratio overall. When the dial is in the central position 43 basic protection is provided to prevent ratios being engaged which could result in overspeeding of the transmission or engine.

Either side of the central position 43 are two so-called "speed matching" zones 45 and 46 in which the above problem when changing between ranges is automatically catered for and the transmission selects the appropriate transmission in box 11 and box 12 to ensure that the next overall ratio of the transmission is selected.

Still further from the central position 43 are two so-called "autodrive" zones 47 and 48 in which the transmission operates as an automatic transmission with the speed at which the ratios are changed up being selected by the position of the dial 40 so that, for example, speed changes at between 1600 rpm and 2200 rpm can be selected by the driver.

When the tractor is operating with the dial set in the autodrive field working zone 47 the transmission can only operated automatically for changes within the epicyclic box 11 at the selected change up speed. This change up speed can by varied on the go by the operator in a continuous manner for all speeds in the 1600 to 2200 rpm range. If a range change is required the button 31 must be depressed.

When the transmission is operating with the dial set in the autodrive road working zone 48 the transmission can be operated automatically for all ratio changes in box 11 and all range changes in box 12 without the need to operate the button 31. Again these changes are made at the speed selected on dial 40 which can again be changed in continuous manner on the go.

With the dial 40 in the field working zone 42 the lever 24 can only select ratio changes in the epicyclic box 11 and any range changes would require the use of pedal 35 or button 31 to disconnect the drive through the transmission.

The console in which dial 40 is mounted also includes a set of indicator lights 50 which indicate which range is currently operating.

The speeds at which the transmission changes down when operating automatically may conveniently be linked to the selected change-up speed. For example, the change down speed may be arranged to be initiated when the engine speed has fallen to 20% below the selected change-up speed.

Although the invention has been described above in relation to a control member in the form of a dial 40, the control member may take any other convenient form. For example, it may comprise a lever moveable linearly in opposite direction from a control position in its field and road working zones.

We claim:

1. A multi-ratio tractor transmission system comprising a transmission having a series arrangement of a speed changing gearbox and a range changing gearbox, the system being selectively operable in a field working automatic mode and a road working automatic mode, wherein the transmission can only operate automatically within its speed change gearbox when the system is operating in the field working automatic mode.

2. A transmission system according to claim 1, wherein an engine speed at which the transmission changes up in ratio being selectable by an operator.

3. A transmission system according to claim 2, wherein the engine speed at which the transmission changes up in ratio is selectable within a pre-defined range.

4. A transmission system according to claim 3, wherein the range is 1600 to 2200 rpm.

5. A transmission system according to claim 2, wherein the engine speed at which the transmission changes down in ratio is linked to a selected engine speed at which the transmission changes up by a predetermined relationship.

6. A transmission system according to claim 1, wherein the speed changing gearbox is a multi-ratio epicyclical gearbox and the range changing gearbox is a synchromesh gearbox.

7. A transmission system according to claim 1, being selectively operable in a speed-matching mode wherein the ratio of the speed changing gearbox is automatically selected so as to deliver a next overall available ratio in the transmission in response to the operator changing the ratio of the range changing gearbox.

8. A transmission system according to claim 1, further comprising a controller having a control member moveable in a field working zone of movement, and a road working zone of movement to set an engine speed at which the transmission changes up in ratio when working in the field and on the road respectively.

9. A transmission system according to claim 8 in which the control member is moveable in a first direction from a central position into the field working zone and in a second direction from the central position into the road working zone.

10. A transmission system according to claim 9 in which, with the control member in its central position, the transmission is set to operate in a manual mode in which ratio changes must be commanded by the operator.

11. A transmission system according to Claim 9 having a series arrangement of a speed changing gearbox and a range changing gearbox wherein either side of the central position two "speed matching" zones are provided for manual selection of an operative ratio for field and road use respectively, the control member when in a respective "speed matching" zone indicating to an overall transmission control system that, when a range change occurs, a ratio of the speed changing gearbox is also to be adjusted to ensure that a ratio provided by the transmission is a next overall ratio in the transmission.

12. A transmission system according to claim 11 in which as the control member is moved still further away from the central position in both the field and road zones it enters an automatic operation zone in which the position of the control member adjusts the speed at which the transmission changes up when operating automatically.

13. A transmission system according to claim 12 in which the position of the control member in the automatic operation zones also determine the speed at which the transmission changes down when operating automatically, the up and down changing speeds being linked by a predetermined relationship.

14. A transmission system according to claim 9 in which the control member comprises a dial with a datum indicator rotatable in one direction from its central position into the field working zone and in the opposite direction into the road working zone.

\* \* \* \* \*